United States Patent
Garrity

(10) Patent No.: US 10,727,759 B2
(45) Date of Patent: Jul. 28, 2020

(54) SMART INVERTER

(71) Applicant: Garrity Power Services LLC, Rockwall, TX (US)

(72) Inventor: Paul Garrity, Rockwall, TX (US)

(73) Assignee: Garrity Power Services LLC, Rockwell, TX (US)

(*) Notice: Subject to any disclaimer, the term of this patent is extended or adjusted under 35 U.S.C. 154(b) by 0 days.

(21) Appl. No.: 16/534,290

(22) Filed: Aug. 7, 2019

(65) Prior Publication Data

US 2020/0052613 A1 Feb. 13, 2020

Related U.S. Application Data

(60) Provisional application No. 62/715,402, filed on Aug. 7, 2018.

(51) Int. Cl.
*H02M 7/537* (2006.01)
*H02J 3/38* (2006.01)

(52) U.S. Cl.
CPC ............ *H02M 7/537* (2013.01); *H02J 3/382* (2013.01)

(58) Field of Classification Search
CPC ................................. G05F 1/67; H02M 7/537
USPC ....... 323/906; 363/95, 97, 98, 131, 132, 137
See application file for complete search history.

(56) References Cited

U.S. PATENT DOCUMENTS

| | | | | |
|---|---|---|---|---|
| 8,259,479 | B2* | 9/2012 | Wagoner | H02J 3/38 363/97 |
| 9,602,023 | B2* | 3/2017 | Collin | H02J 3/383 |
| 2009/0000654 | A1* | 1/2009 | Rotzoll | H02M 7/493 136/244 |
| 2011/0013432 | A1* | 1/2011 | Wagoner | H02J 3/383 363/95 |
| 2012/0091817 | A1* | 4/2012 | Seymour | H02J 3/383 307/82 |
| 2012/0098346 | A1* | 4/2012 | Garrity | H02J 3/383 307/82 |
| 2013/0229842 | A1* | 9/2013 | Garrity | H02J 3/383 363/95 |
| 2014/0025215 | A1* | 1/2014 | Carlson | H02J 3/383 700/292 |
| 2016/0276838 | A1* | 9/2016 | Mumtaz | G05B 15/02 |
| 2017/0040801 | A1* | 2/2017 | Robison | H02S 20/30 |
| 2017/0104336 | A1* | 4/2017 | ElBsat | H02J 3/32 |

* cited by examiner

*Primary Examiner* — Gary A Nash
(74) *Attorney, Agent, or Firm* — Hovey Williams LLP

(57) ABSTRACT

A power inverter configured to convert electrical power from an energy source to electrical power that can be pushed into a utility grid. The power inverter comprises a power train and a controller having an address. The controller is configured to provide gate drive signals to the power inverter for the power inverter to operate. The controller comprises a sensor for measuring electrical power that is pushed into the utility grid, non-volatile memory for storing an accumulated value of the electrical power, and a communication device configured to communicate information from the controller to a device remote from the power inverter. The controller is further configured to execute a smart contract corresponding to the address.

18 Claims, 4 Drawing Sheets

SMART INVERTER

RELATED APPLICATIONS

This patent application is a continuation application and claims priority benefit with regard to all common subject matter, of earlier-filed U.S. Provisional Patent Application Ser. No. 62/715,402, filed on Aug. 7, 2018, and entitled "Smart Inverter". The identified earlier-filed provisional patent application is hereby incorporated by reference in its entirety into the present application.

BACKGROUND

Green energy refers to energy produced in such a fashion as to not harm the environment. Examples of green energy sources are photovoltaic panels and wind turbines. It has become customary for utilities in various parts of the world to sell green energy, for which some users are willing to pay a premium. In other cases, utilities or governments use incentives to encourage the purchase of green energy. Some governments encourage the purchase of green energy tokens corresponding to specific quantities of green energy, and in some cases, to specific green energy sources that are effectively assigned to a utility customer.

Green energy production is typically monitored through the use of standard utility-grade meters that are electrically situated between green energy sources and the utility grid. A problem with this setup is the difficulty in verifying the actual energy source. It is relatively straight-forward for someone to replace an expensive green energy source (such as a photovoltaic panel and inverter) with a less expensive polluting energy source (such as a diesel generator).

SUMMARY

These and other problems are solved or circumvented, and technical advantages are achieved, by embodiments of the present invention. A first embodiment of the invention is a power inverter configured to convert electrical power from an energy source to electrical power that can be pushed into the utility grid, the power inverter comprising a power train and a controller having an address. The controller is configured to provide gate drive signals to the power inverter for the power inverter to operate. The controller comprises a sensor for measuring electrical power that is pushed into the grid, non-volatile memory for storing an accumulated value of the electrical power, and a communication device configured to communicate information from the controller to a device remote from the power inverter, the controller further being configured to execute a smart contract corresponding to the address.

Another embodiment of the invention is a smart inverter power system comprising a gateway, an exchange, and a power inverter configured to push power into a utility grid. The power inverter comprises a controller having an address, a sensor for measuring generated power, non-volatile memory for storing an accumulated value of the generated power, and a communication device configured to communicate information to and from the controller to the gateway. The gateway is configured to communicate with the exchange so that the controller can execute a smart contract corresponding to the address.

In a further embodiment, the smart inverter power system also comprises a power meter configured to communicate with the gateway and measure power flowing into or out of the utility grid. The gateway is configured to determine whether or not the power inverter is coupled to the utility grid by comparing reported power from the power inverter with reported power from the power meter.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different FIGUREs generally refer to corresponding parts unless otherwise indicated, and may not be re-described in the interest of brevity after the first instance.

DETAILED DESCRIPTION

Figure 1:
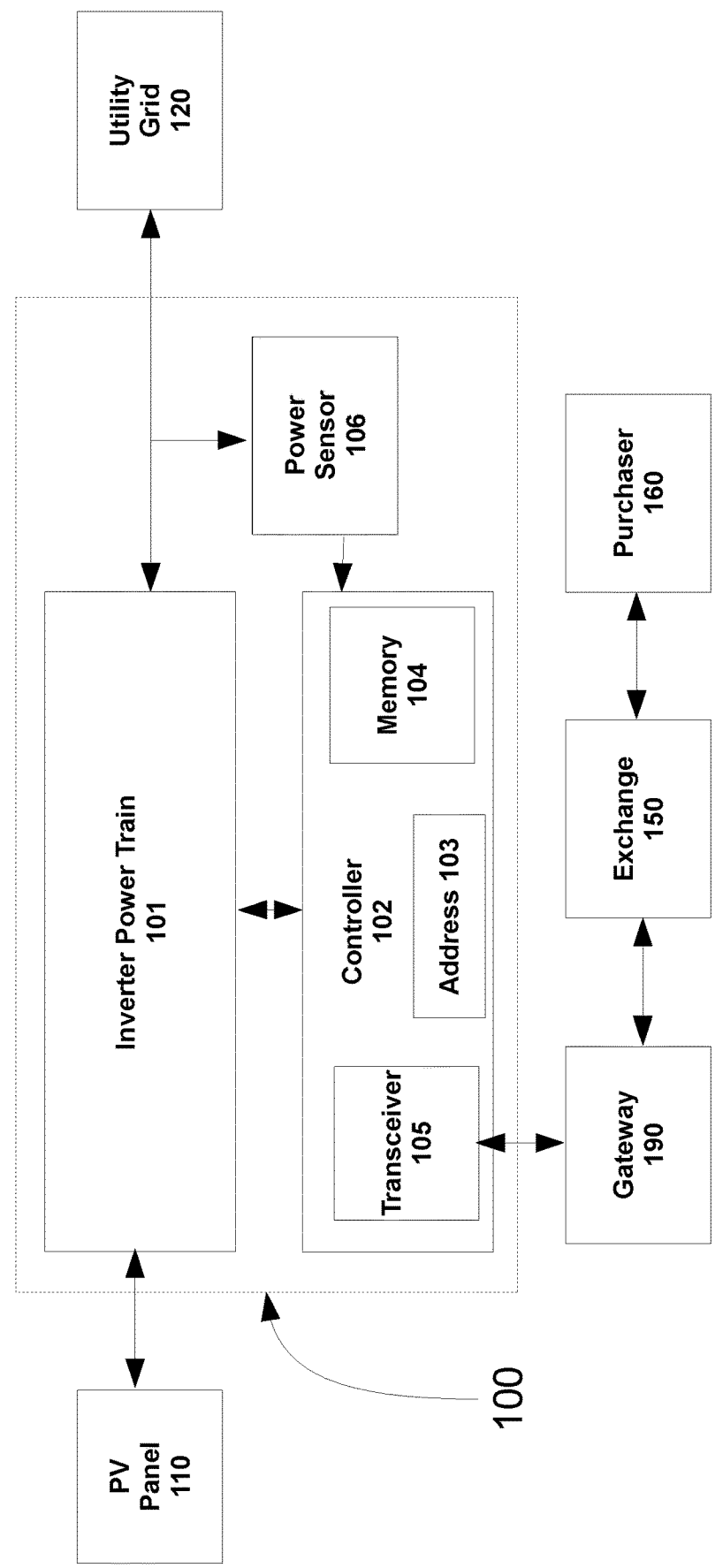
FIG. 1 is a schematic diagram of a smart inverter constructed in accordance with an embodiment of the invention.

Turning to FIG. 1, Smart Inverter 100 comprises Inverter Power Train 101, Controller 102, and Power Sensor 106. Inverter Power Train 101 controls power flow from Photovoltaic Panel 110 to push power into Utility Grid 120. Note that Photovoltaic Panel 110 could be replaced with other generation devices such as, but not limited to, a wind turbine.

Controller 102 comprises Transceiver 105 and Memory 104. Controller 102 also has Address 103. Address 103 may be a blockchain address, for example. Power Sensor 106 measures the power pushed into Utility Grid 120 by Smart Inverter 100. Power Sensor 106 may be a utility-quality power meter.

Controller 102 may further comprise a pulse-width-modulation control circuit configured to provide pulse-width-modulation signals to power semiconductor switches of Inverter Power Train 101 for controlling the flow of power into Utility Grid 120. Controller 102 may further comprise Memory 104. Memory 104 is a non-volatile memory storage element configured to store a measurement of accumulated power pushed into Utility Grid 120 by Smart Inverter 100.

Exchange 150 is a financial exchange configured to perform financial transactions. Exchange 150 may be a blockchain or any other suitable financial exchange. Controller 102 is configured to effect financial exchanges involving the selling of fixed amounts of power (energy tokens) pushed into Utility Grid 120 by Smart Inverter 100. Information between Exchange 150 and Smart Inverter 100 is exchanged through Transceiver 105 and Gateway 190. Note that Transceiver 105 could be replaced with a wired communication connection such as an RS485 connection to provide the same overall functionality. That is, Smart Inverter 100 comprises a means to communicate with Gateway 190. Gateway 190 may be configured to identify information about Smart Inverter 100 based on the Address 103.

Figure 2:
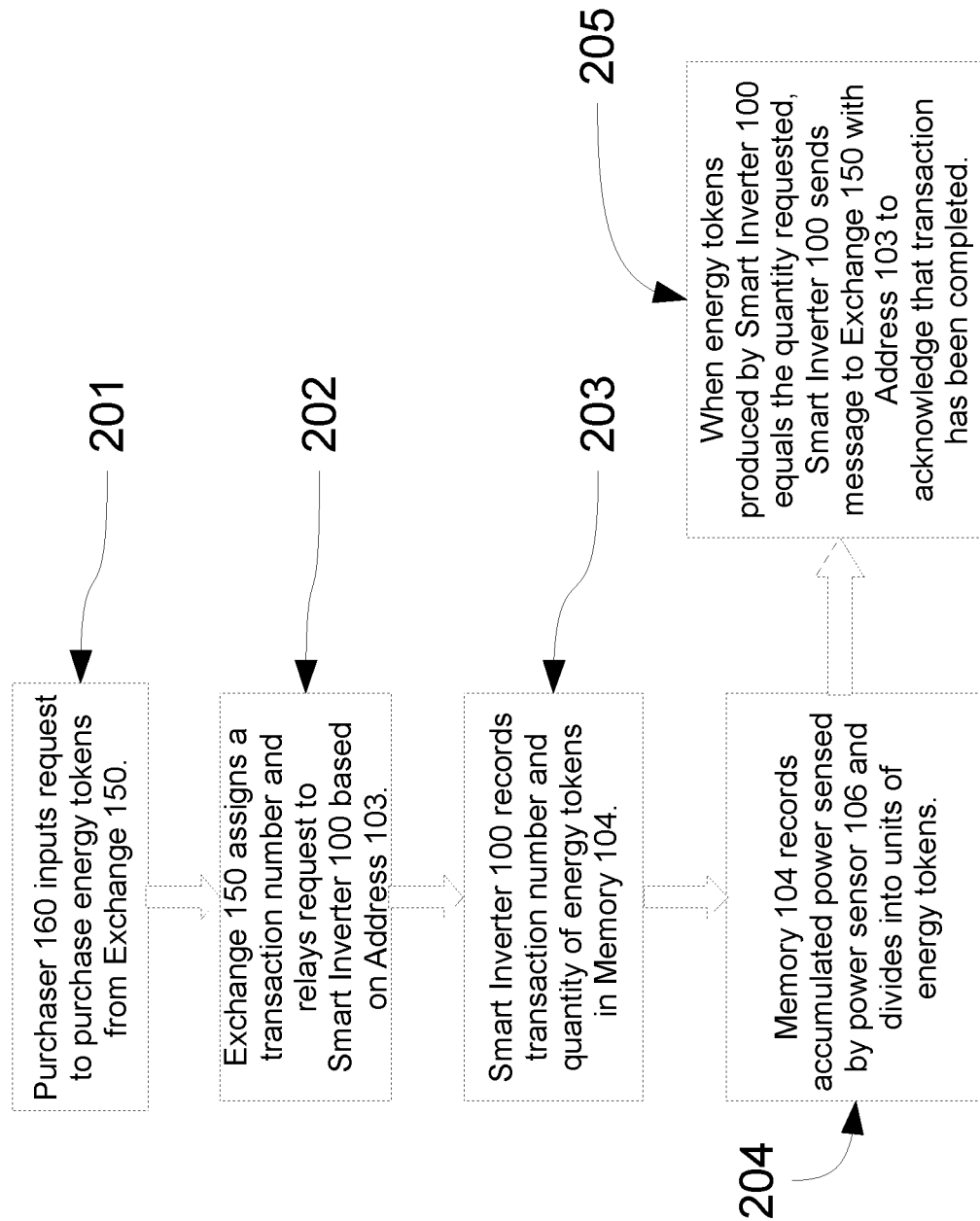
FIG. 2 is a flow diagram depicting certain steps of a process to generate a smart contract in accordance with another embodiment of the invention.

Turning to FIG. 2, a method of implementing a Smart Contract between Smart Inverter 100 and Purchaser 160 will now be described in detail. In Step 201, Purchaser 160 inputs a request to purchase energy tokens via Exchange 150. This step will typically occur through an interface on a secure website. In Step 202, Exchange 150 assigns a transaction number and relays a request comprising the transaction number, a requested address (in this case Address 103), and the quantity of desired energy tokens to Smart Inverter 100. In Step 203, Smart Inverter 100 records the transaction number and the quantity of desired energy tokens in Memory 104. In Step 204, Memory 104 records a value of the accumulated power sensed by power sensor 106 and divides into units of energy tokens. Once the requested amount of energy has been produced (i.e. pushed into Utility Grid 120), then in Step 205, Smart Inverter 100 sends a message to Exchange 150 using Address 103 to acknowledge that the transaction has been completed. Execution of the Smart Contract may further comprise acknowledgement of intent to enter into the Smart Contract and a response with an assent to accept the Smart Contract.

The above transaction (and other transactions) may be recorded via a blockchain ledger, thus guaranteeing an opportunity to publicly verify each step. Since Controller 102 performs the smart contract process from the side of Smart Inverter 100, and Controller 102 also provides functionality to Inverter Power Train 101, Purchaser 160 and utility owners can each verify the source of the energy that was purchased, thus verifying that green energy was bought and sold.

Figure 3:
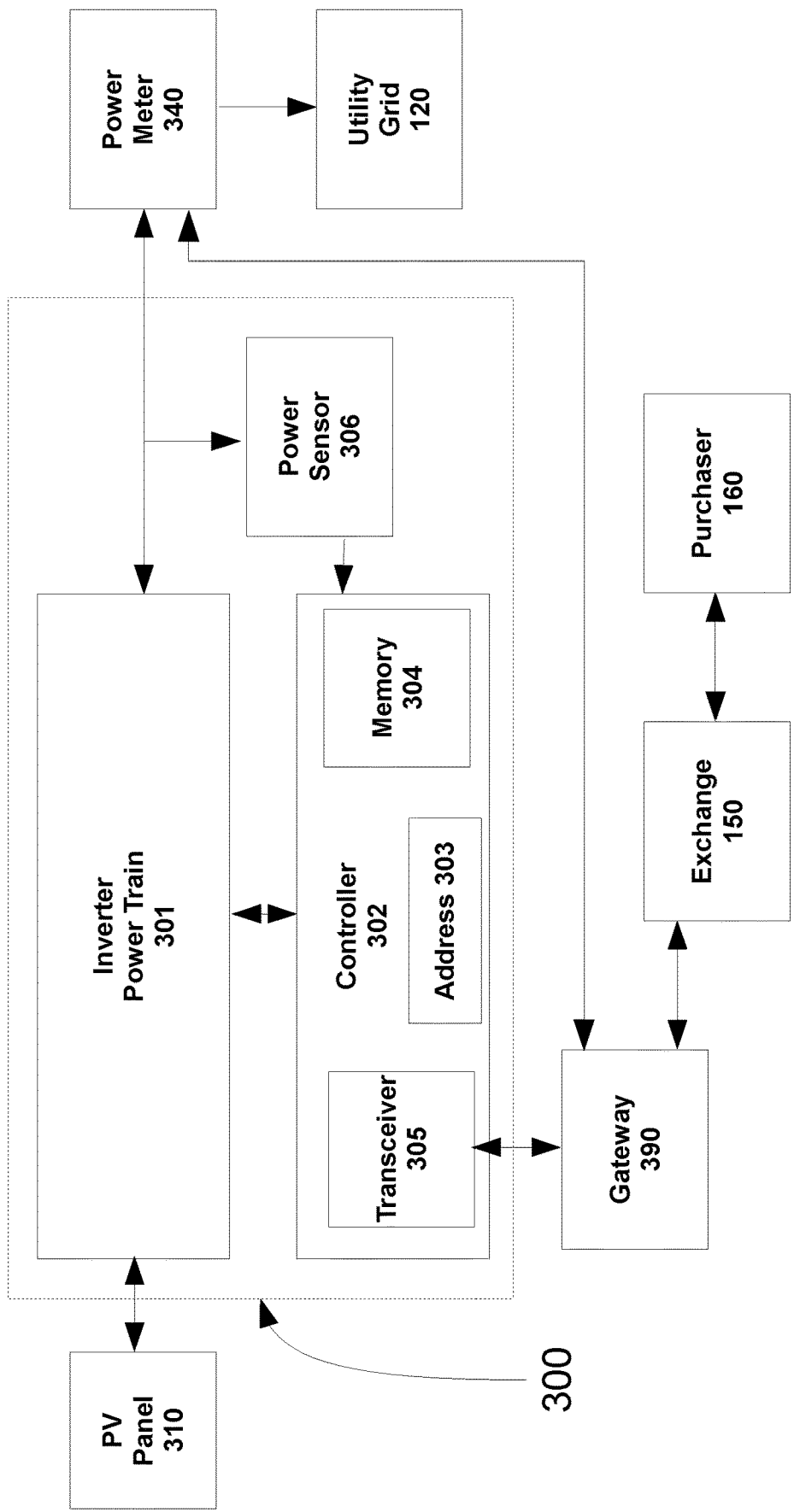
FIG. 3 is a schematic diagram of a smart inverter power system comprising a single smart inverter in accordance with another embodiment of the invention.

Turning to FIG. 3, an embodiment of a Smart Inverter Power System comprising PV Panel 310, Smart Inverter 300, Power Meter 340, Utility Grid 120, Gateway 390, and Exchange 150 will now be discussed in more detail. PV Panel 310, Inverter Power Train 301, Controller 302, Address 303, Memory 304, and Transceiver 305, are similar to PV Panel 110, Inverter Power Train 101, Controller 102, Address 103, Memory 104, and Transceiver 105, respectively, and similar functionality will not be described in the interest of brevity. There are some differences between components in FIGS. 1 and 3 which will now be discussed in more detail.

As mentioned above, Power Sensor 106 in FIG. 1 may be a utility-grade power sensor. That is, Power Sensor 106 may be certified to measure the flow of utility power with adequate accuracy to be used by a utility company to measure and charge a customer for power. Utility-grade power sensors may be expensive and bulky, thus increasing the cost and size of Smart Inverter 100, as well as increasing time-to-market for design of Smart Inverter 100. Meanwhile, Power Sensor 306 in FIG. 3 may not be a utility-grade power sensor. As such, Power Sensor 306 may be lower cost and require far less space than Power Sensor 106. For example, Power Sensor 306 may use its internal power-push setting to estimate grid power.

Power Meter 340 is a utility-grade power meter which is configured to communicate power information to Gateway 390. Gateway 390 is configured to compare power readings from Power Sensor 306 and Power Meter 340. If the reading from Power Sensor 306 is verified by Gateway 390 to continuously remain within the reading of Power Meter 340 within a predetermined error amount, such as 2%, then Gateway 390 may transmit a correction signal to Smart Inverter 300 causing Smart Inverter 300 to record utility-grade levels of power. Procedures for Smart Contracts executed between Purchaser 160 with Smart Inverter 300 and between Purchaser 160 and Smart Inverter 100 are then identical.

Figure 4:
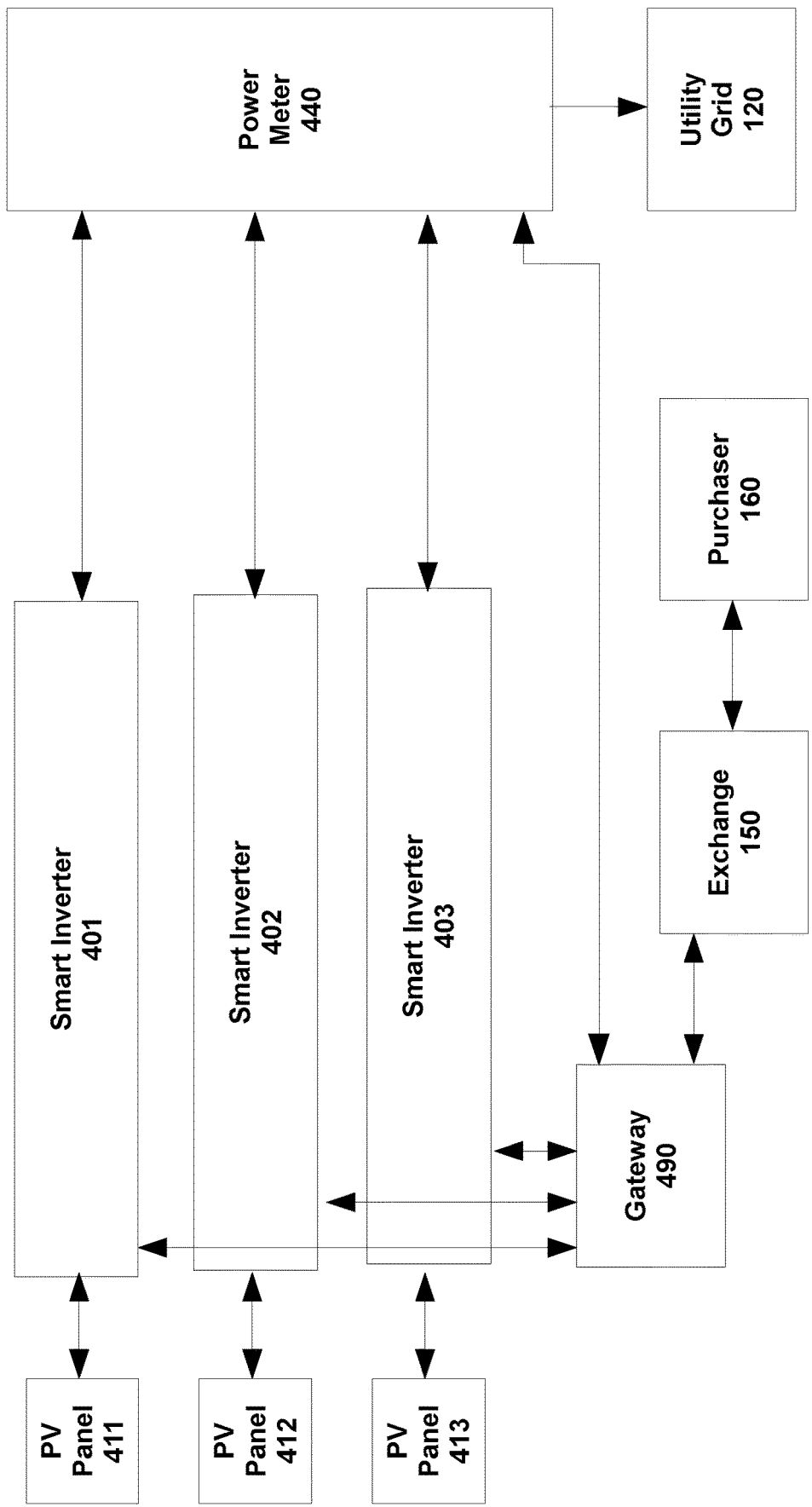
FIG. 4 is a schematic diagram of a smart inverter power system comprising multiple smart inverters in accordance with another embodiment of the invention.

Turning to FIG. 4, another embodiment of a Smart Inverter Power System comprising PV Panels 411, 412, and 413, Smart Inverters 401, 402, and 403, Power Meter 440, Gateway 490, Utility Grid 120, and Exchange 150 will now be discussed in more detail. PV Panels 411, 412, and 413 may all be similar to PV Panel 310 in FIG. 3. Smart Inverters 401, 402, and 403 may be similar to Smart Inverter 300 in FIG. 3. Functionality of the system in FIG. 4 is similar to functionality of the system in FIG. 3, except that the system in FIG. 4 has a plurality of Smart Inverters coupled to Utility Grid 120 through Power Meter 440 whereas the system in FIG. 3 may have only a single Smart Inverter coupled to Utility Grid 120 through Power Meter 340.

Whereas Power Meter 340 may only need to verify power flow from a single inverter, thus matching power one-for-one between Meter 340 and Inverter 300, Power Meter 440 must verify power flow from the plurality of Smart Inverters. This problem is resolved by constant communication of power readings between Gateway 490 with Power Meter 440 and between Gateway 490 and each of Smart Inverters 401, 402, and 403. There are various methods that can be used to calibrate the system in FIG. 4. One method involves configuring Gateway 490 to momentarily turn off each of Smart Inverters 401, 402, and 403 in turn, at various times of the day, to determine their correct calibration values in calibration against Power Meter 440. Another method involves averaging power error over all Smart Inverters that are pushing power into Utility Grid 120 through Power Meter 440.

Other effective alternatives will occur to a person skilled in the art. For example, the gateways described with reference to FIGS. 1, 3, and 4 could be coupled to Smart Inverters through wired connections rather than through wireless connections. Furthermore, the gateways could use LoRa transmission and encryption schemes, such as a 3-pair key encryption standard, to increase security of system data.

Although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof. To that end, those skilled in the art should understand that the previously described embodiments of the power inverter and related methods of operating the same are submitted for illustrative and exemplary purposes only.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed:

1. A power inverter configured to convert electrical power from an energy source to electrical power that can be pushed into a utility grid, the power inverter comprising:
   a power train configured to be electrically connected between the energy source and the utility grid; and
   a controller having an address, the controller being configured to provide gate drive signals to the power inverter for the power inverter to operate, the controller comprising:
      a sensor for measuring electrical power that is pushed into the grid;
      non-volatile memory for storing an accumulated value of the electrical power; and
      a communication device configured to communicate information from the controller to a device remote from the power inverter, the controller further being configured to execute a smart contract corresponding to the address.

2. The power inverter of claim 1, wherein execution of the smart contract comprises acknowledging intent to enter into the smart contract and responding with an assent to accept the smart contract.

3. The power inverter of claim 1, wherein execution of the smart contract comprises sale of energy tokens, the energy tokens being directly related to the accumulated value of generated power.

4. The power inverter of claim 1, wherein the address is a blockchain address.

5. The power inverter of claim 1, wherein the controller is further configured to encrypt information sent through the communication device.

6. The power inverter of claim 1, wherein the power inverter is further configured to be electrically connected to a wind turbine.

7. The power inverter of claim 1, wherein the power inverter is further configured to be electrically connected to a photovoltaic panel.

8. The power inverter of claim 7, wherein the controller further comprises a pulse-width-modulation control circuit configured to provide pulse-width-modulation signals to power semiconductor switches for controlling the flow of power into the utility grid.

9. A smart inverter power system for converting electrical power from an energy source to electrical power that can be pushed into a utility grid, the smart inverter power system comprising:
   a gateway configured to be communicatively coupled with an exchange; and
   a power inverter configured to be electrically connected between the energy source and the utility grid, the power inverter being communicatively coupled with the gateway, the power inverter comprising:
      a controller having an address;
      a sensor for measuring generated power;
      non-volatile memory for storing an accumulated value of the generated power; and
      a communication device communicatively coupled to the gateway so that the controller is configured to communicate with the exchange and execute a smart contract corresponding to the address.

10. The smart inverter power system of claim 9, wherein execution of the smart contract comprises sale of energy tokens, the energy tokens being directly related to the accumulated value of generated power.

11. The smart inverter power system of claim 9, wherein the power inverter is further configured to be electrically connected to a photovoltaic panel.

12. The smart inverter power system of claim 9, further comprising a power meter configured to communicate with the gateway, the power meter being configured to measure power flowing into or out of the utility grid, the gateway being configured to determine whether or not the power inverter is coupled to the utility grid by comparing reported power from the power inverter with reported power from the power meter.

13. The smart inverter power system of claim 12, wherein the power inverter and the power meter communicate with the gateway using wireless transmission.

14. The smart inverter power system of claim 13, wherein the wireless transmission comprises a LoRa transmission system that uses a 3-pair key encryption system standard for LoRa systems.

15. The smart inverter power system of claim 12, wherein the power inverter and the power meter communicate with the gateway via a wired communication cable.

16. The smart inverter power system of claim 15, wherein the wired communication cable comprises an RS485 cable.

17. The smart inverter power system of claim 9, wherein the address is a blockchain address.

18. The smart inverter power system of claim 9, wherein the gateway is configured to identify information about the power inverter based on the address.

* * * * *